March 6, 1962 M. W. SHELER 3,023,827
POWER STEERING MECHANISM
Filed March 9, 1959 3 Sheets-Sheet 3
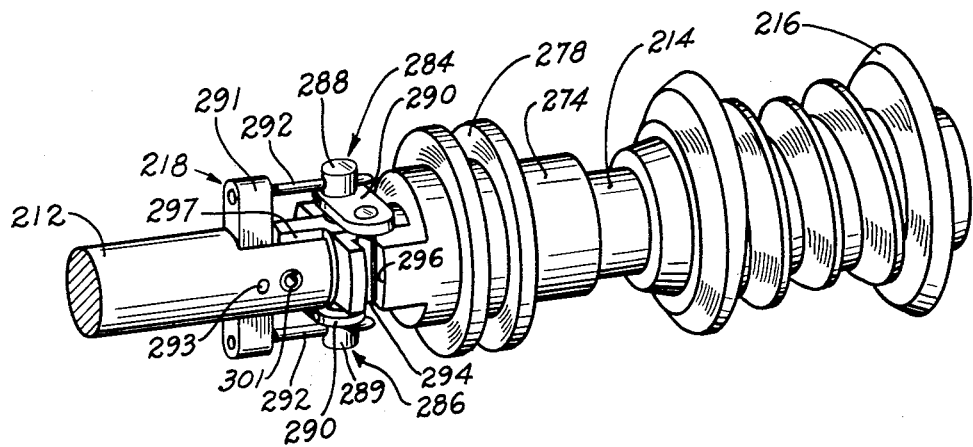
FIG_5
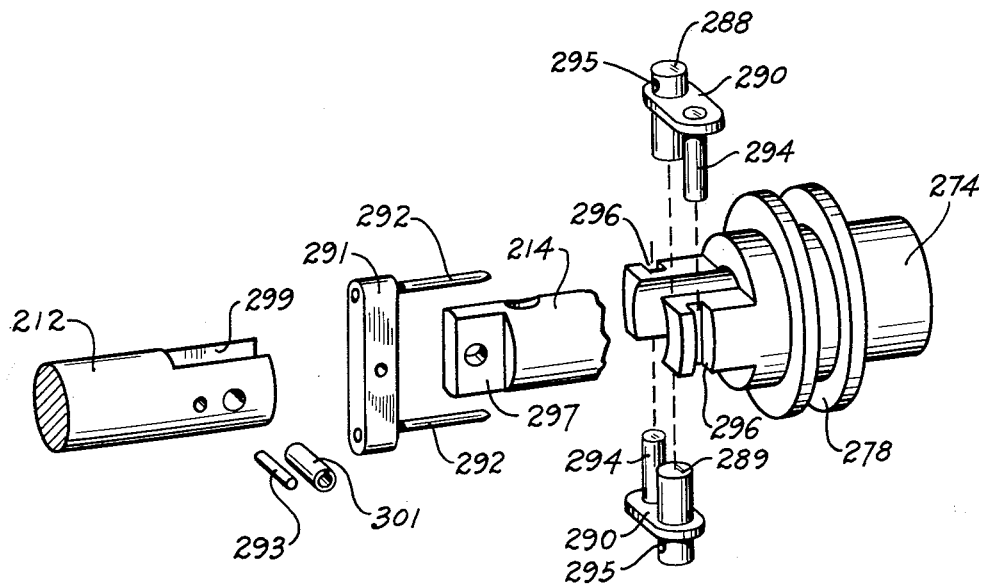
FIG_6
INVENTOR.
MILO W. SHELER.
BY
William N. Antonio
ATTORNEY.

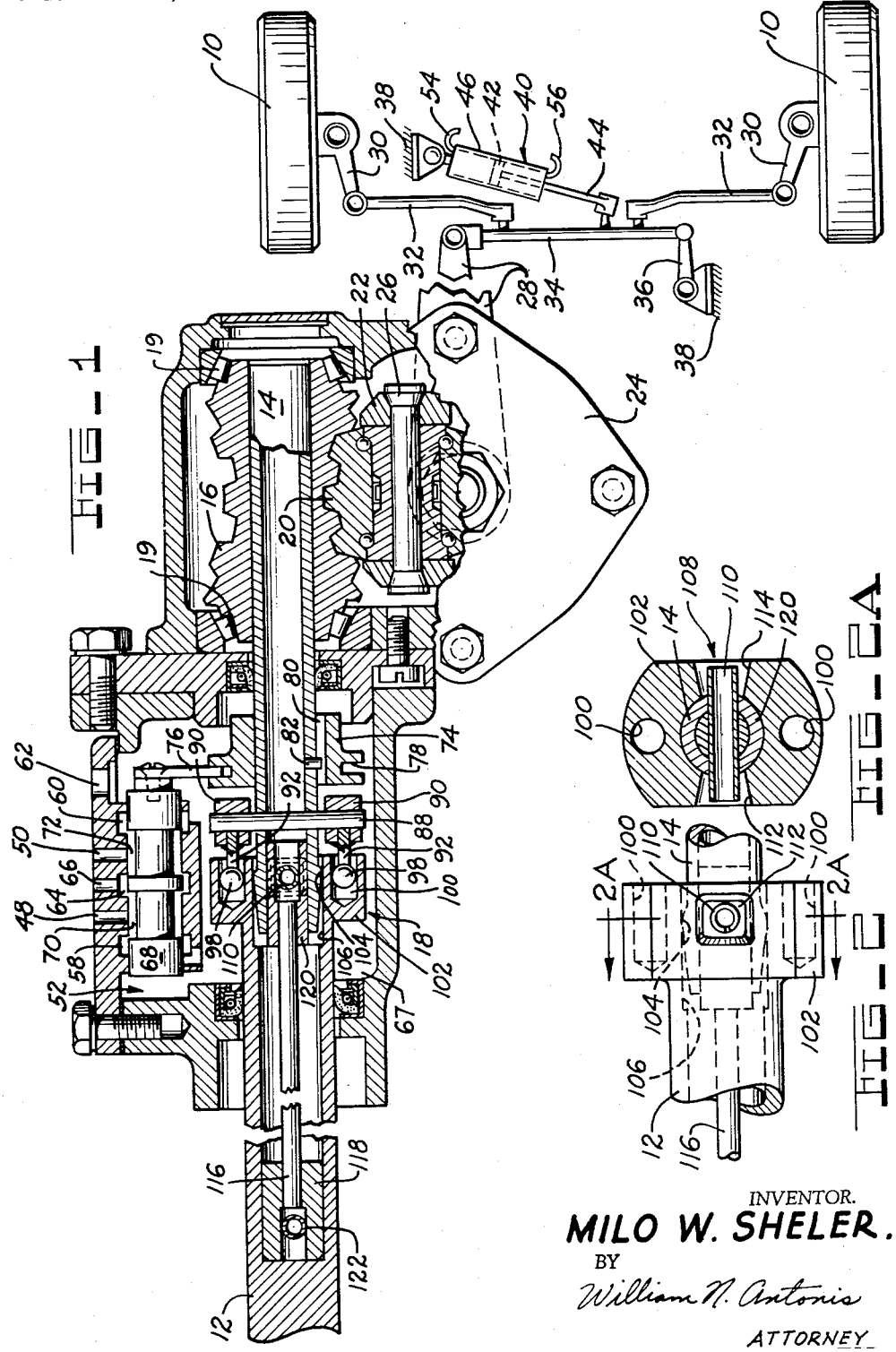

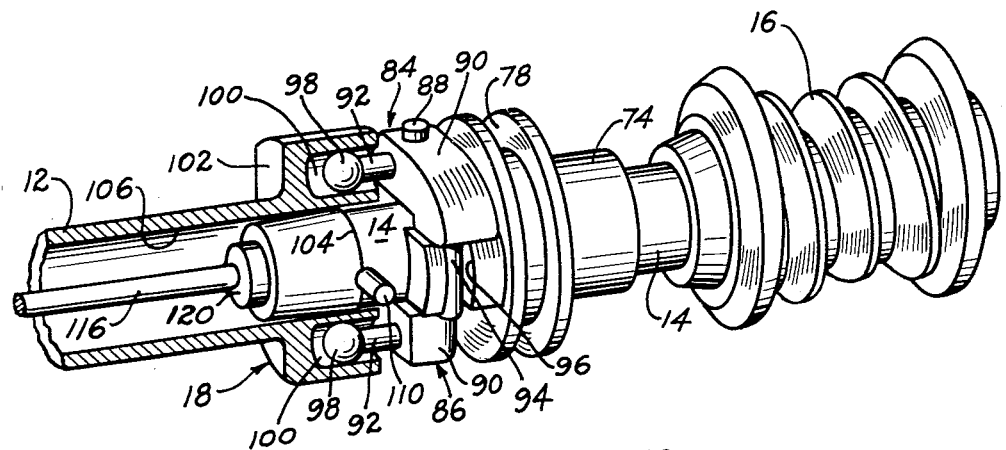
FIG_3
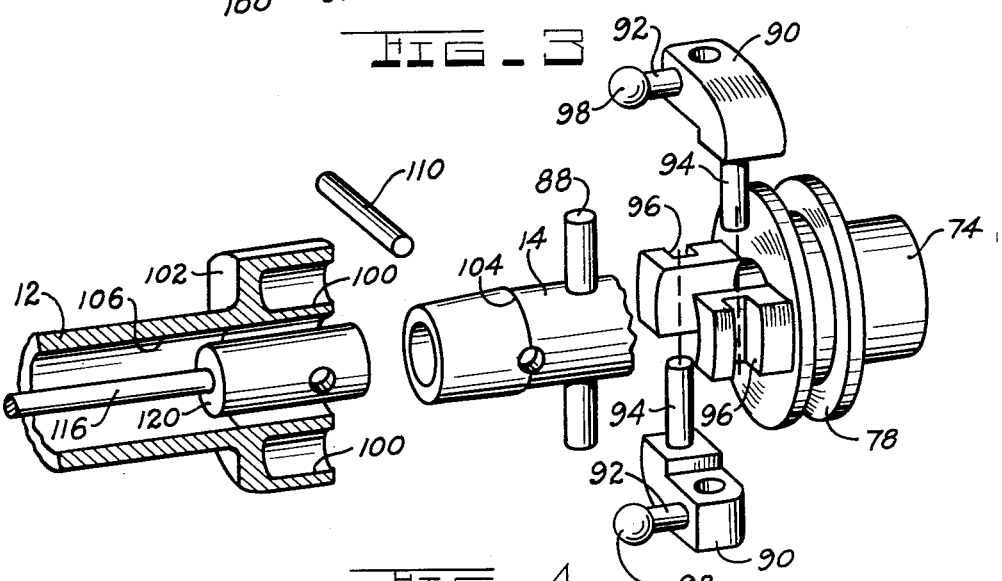
FIG_4
INVENTOR.
MILO W. SHELER.
BY
William N. Antonio
ATTORNEY.

United States Patent Office 3,023,827
Patented Mar. 6, 1962

3,023,827
POWER STEERING MECHANISM
Milo W. Sheler, South Bend, Ind., assignor to The Bendix Corporation, a corporation of Delaware
Filed Mar. 9, 1959, Ser. No. 797,942
13 Claims. (Cl. 180—79.2)

This invention relates to power steering and more specifically to a valve actuating and "feel" transmitting mechanism therefor.

One of the objects of this invention is to provide a power steering control mechanism which may be adapted to any type of conventional steering gear that is operated by a rotatable steering wheel and shaft.

More particularly, it is an object of this invention to provide a simple power steering control mechanism which is located at the point where control is most desirable, namely between the steering gear and the steering wheel.

Since vehicle steering shafts are relatively long and since there is some relative movement between the mounting arrangement at the steering wheel and the gear box, it is not practical to maintain good alignment throughout the entire length of the steering shaft. Quite often the deflection which may occur because of relative movement between the mounting arrangement at the steering wheel and the gear box are taken right in the steering shaft. However, when a valve actuator or control mechanism is incorporated in the steering shaft such deflection cannot be tolerated, since it would adversely affect the valve actuator. In order to avoid such steering shaft deflection and other possible misalignment problems some power steering arrangements have interposed rubber bushed couplings to allow universal joint action.

With these thoughts in mind, it is a primary object of this invention to provide a power steering control mechanism between the steering gear and steering wheel which includes a universal joint action in its basic construction, thereby eliminating the need for any additional coupling.

Another object of this invention is to provide a power steering mechanism wherein rotational motion of the steering shaft in and of itself will not cause axial movement of said shaft.

A further object of this invention is to provide mechanical means for creating adequate synthetic "feel" through the entire steering range from parking to high speeds.

A still further object of this invention is to provide a valve actuating mechanism which incorporates in its basic construction mechanical means for creating adequate synthetic "feel."

More particularly, it is an object of this invention to provide a bell crank valve actuating mechanism wherein one of the bell crank arms is a cantilever spring which creates synthetic "feel" upon rotation of the steering shaft.

A further object of this invention is to provide means for manual steering in the event of power failure.

The above and other objects and features of the invention will become apparent from the following description of the mechanism taken in connection with the accompanying drawings which form a part of this specification and in which:

FIGURE 1 is a sectional view of a power steering unit incorporating my invention, which is shown in association with parts of a vehicle drawn schematically;

FIGURE 2 is a plan view of a portion of the valve actuating mechanism shown in FIGURE 1;

FIGURE 2A is a section taken along line 2A—2A of FIGURE 2;

FIGURE 3 is a perspective view of the valve actuating mechanism shown in FIGURE 1 with portions broken away for clarity;

FIGURE 4 is an exploded view of part of the mechanism shown in FIGURE 3;

FIGURE 5 is a perspective view of another embodiment of my valve actuating mechanism which may be incorporated into the power steering unit of FIGURE 1; and FIGURE 6 is an exploded view of part of the mechanism shown in FIGURE 5.

Referring to FIGURE 1, the reference numeral 10 designates the front wheels of a vehicle to be steered by rotation of a steering wheel (not shown) which is connected to steering shaft 12. A shaft section 14, having a worm gear 16 of the hour glass type mounted on the end thereof, is drivably connected to the steering shaft 12 by means of a control assembly indicated generally by the numeral 18. The shaft section 14 is held against axial displacement by thrust bearings 19 located at each end of the worm. A roller sector gear 20 is arranged in meshing relationship with the worm gear and is carried by one end of a rock shaft 22 which is properly journaled in housing 24. The roller sector gear 20 is rotatably carried on a pivot pin 26 suitably supported at one end of the rock shaft 22. A pitman arm 28 is connected to the rock shaft 22 and to the spindle arms 30 of the wheels 10 through a steering linkage assembly which includes tie rods 32, a cross tie rod 34, and an idler arm 36 suitably pivoted at one end to the vehicle frame 38.

The hydraulic system of the steering gear includes a fluid motor 40 which is connected between the cross tie rod 34 and the vehicle frame 38. The fluid motor includes a piston 42, a piston rod 44 suitably attached to the cross tie rod 34, and a cylinder 46 connected to the vehicle frame 38. The piston 42 divides the cylinder 46 into opposed chambers constantly communicating respectively with cylinder ports 48 and 50 of valve 52, via conduits 54 and 56. The valve is of conventional construction and includes two grooves 58 and 60 in the valve body which communicate with a reservoir (not shown) via return port 62, and a third groove 64 intermediate grooves 58 and 60 which communicates with a pump (not shown) via inlet port 66. Communication between grooves 58 and 60 and the return port 62 is by way of chamber 67 which is normally filled with fluid. The valve spool 68 is provided with two grooves 70 and 72 which communicate with cylinder ports 48 and 50 respectively and which overlap the grooves in the valve body to provide open passages through the valve when the spool is in neutral position.

Referring to FIGURES 1 through 4, valve actuation is provided through means of the control assembly 18, said assembly including a sleeve 74 which is slidably connected to the shaft section 14 and rigidly connected to the valve spool 68 by suitable means such as yoke 76 which is received in an annular groove 78 formed on the sleeve. A slot 80 formed within sleeve 74 and a guide pin 82 fixed to shaft section 14 prevent relative rotation between the sleeve and shaft but permit axial movement of the sleeve with respect to the shaft. A pair of bell crank levers 84 and 86 are pivotally connected to shaft section 14 through means of a pin 88 which is a tight fit with respect to shaft section 14 and a loose fit with respect to the bell crank levers. The pivotal connection of the bell crank levers which constitutes the fulcrum point of the levers has an axis substantially perpendicular to the axis of the shaft section 14. Each of the bell crank levers has two arms 90 and 92 which extend from the pivotal connection, one of which is operatively connected to sleeve 74 through means of the bell crank pin 94 and the slot 96 formed in the sleeve and the other of which is operatively connected to steering shaft 12 through means of a ball stud 98 formed on the end of arm 92 which is received in a bore 100 formed in flange 102 of the steering shaft.

In order to allow for possible misalignment and deflection problems between the steering shaft 12 and shaft section 14, which are likely to result because of relative motion between the body of the vehicle to which the steering shaft 12 is connected and the frame of the vehicle to which the gear shaft or shaft section 14 is connected, a limited angle universal joint is incorporated in the basic control assembly construction. This universal joint action is provided through means of a tapered annular rounded bearing surface 104 formed near one end of shaft section 14 which bears against the wall of steering shaft bore 106 so that a spherical coupling or swivel connection is formed between the shafts 12 and 14.

A pin and slot arrangement 108, which does not hinder the universal joint action between the two shafts 12 and 14, is utilized to provide for manual steering in the event of power failure. This arrangement includes a pin 110 which extends through shaft section 14, the ends of which are disposed in slots 112 and 114 having four tapered sidewalls. By using tapered slots it is possible to achieve a limited angle universal joint. It should be noted that the universal action is not hindered in any way by the bell crank arrangement, since the ball studs 98 on the end of arms 92 are freely slidable within the bores 100.

Mechanical "feel" is provided through means of a torsion bar 116, having adapters 118 and 120 on the ends thereof for attachment to steering shaft 12 by a pin 122 and to shaft section 14 by the pin 110.

The operation of my steering mechanism is as follows: Upon initial turning of steering shaft 12, a certain amount of steering force is transmitted directly to shaft section 14 through torsion bar 116. The torsion bar 116, which will begin to torsionally deform upon any slight rotational movement of steering shaft 12 with respect to shaft section 14 is capable of transmitting rotational forces from the steering shaft 12 to shaft section 14 in proportion to the degree of its torsional deformation. At the slightest amount of relative rotation between the two shafts 12 and 14 the bell crank levers 84 and 86 will begin to pivot about pin 88 thereby causing immediate axial movement of sleeve 74, which is connected to valve spool 68, but no power boost will result until axial movement of the sleeve has moved the valve spool to a cut-off position which will result in increased pressurization of one or the other of the power cylinder chambers. Thus, rotational movement of the steering shaft in a clockwise direction (looking at FIGURES 1 and 3 from the left) will cause the sleeve 74 to move away from steering shaft 12 and will cause valve spool 68 to move from its neutral position to the right until it reaches a cut-off position at which time increased fluid pressure will be directed from the inlet port 66 to the appropriate end of power cylinder 40 via cylinder port 48. Rotational movement of the steering shaft in a counterclockwise direction will cause sleeve 74 to move towards steering shaft 12 and will cause movement of the valve spool to the left. This will result in the directing of increased fluid pressure from inlet port 66 to the opposite end of power cylinder 40 via cylinder port 50.

Through means of the torsion bar and bell crank arrangement disclosed, it is possible not only to achieve a relatively direct actuation of a power steering control valve through rotation of the steering shaft, but to also transmit to the driver a relatively accurate and true "feel" of the road. Thus, in the disclosed power steering mechanism a hydraulic assist is provided only at such times as when the resistance to movement of the steering linkage exceeds the rotational force which can be transmitted by the torsion bar without valve closure, that is without the valve spool being moved to a cut-off position which will result in pressurization of one side or the other of the power cylinder. If the steering linkage does not exert enough resistance to torsionally deform the torsion bar and cause relative rotation between the steering shaft and lower shaft section, then only the manually exerted force at the steering wheel will be necessary to cause movement of the steering linkage, and no hydraulic assist will result. In this manner synthetic "feel" is transmitted to the driver from the very beginning and under all driving conditions.

It should be noted that since a universal joint action has been incorporated directly in the valve control mechanism any relative movement between the vehicle body and frame will not adversely affect the power boost mechanism and that in the event of power failure manual steering is available once the pin 110 has made contact with the tapered walls of slots 112 and 114 of the pin and slot arrangement 108.

FIGURES 5 and 6 show an alternate arrangement of my actuating mechanism which may be incorporated in the power steering unit shown in FIGURE 1. In these figures like parts are designated by like numbers plus 200. It will be noted that the steering shaft 212 is drivably connected to a shaft section 214, which has a worm gear 216 on the end thereof, by means of a control assembly 218. The control assembly 218 differs from the control assembly of FIGURES 1 and 3 in the following respects: The control assembly 218 includes a sleeve 274 which is slidably connected to a shaft section 214 and rigidly connected to the valve spool 68 by suitable means such as yoke 76 which is received in an annular groove 278 formed on the sleeve. A pair of bell crank levers 284 and 286, each having two arms 290 and 292, are pivotally connected to shaft section 214 through means of stub pins 288 and 289 located at the junction of said two arms. The arms 290, which are rigidly connected to stub pins 288 and 289, are operatively connected to sleeve 274 through means of the bell crank pins 294 and the slots 296 formed in the sleeve. The other arms 292, which are in effect cantilever springs for providing "feel" are rigidly connected to a steering shaft cross bar 291, said cross bar being fastened to the steering shaft by pin 293. The other end of the arms 292 are slidable within drilled holes 295 which are located in the stub pins 288 and 289. It should be noted that stub pins 288 and 289 extend into shaft section 214, but are a loose fit with respect thereto. A tongue and groove arrangement is utilized to provide for manual steering in the event of power failure, wherein a tongue 297 is formed on the end of shaft section 214 and a groove 299 is formed on the end of steering shaft 212. The walls of this groove are tapered in a manner similar to the walls of the slots 112 and 114 shown in FIGURE 2A. A pin 301, which extends through the tongue and groove arrangement is a tight fit with respect to the steering shaft 212 and loose fit with respect to the shaft section 214 so as to permit relative movement between the two shafts within the limits of the opposed tapered walls of the groove 299. In this embodiment a universal joint action is provided by the sliding movement between the flexible bell crank arms 292 and pins 288 and 289, and also by the actual deflection of the arms 292. In one plane primarily sliding movement between the flexible bell crank arms and pin will occur while in a plane 90° therefrom the universal joint action will be primarily a bending action of the flexible arms. For movements in between these two planes various degrees of flexing and sliding will occur. Because of the lost motion between the tongue 297 and groove 299 and because of the loose fit between the pin 301 and the tongue 297, the universal joint action will not be impeded in any manner.

Operation of the FIGURE 5 valve actuator is essentially the same as previously described except that in this arrangement the torsion bar is eliminated and one of the bell crank arms of each of the bell cranks is formed so as to constitute a cantilever spring for transmitting "feel" to the vehicle operator. It should be noted that the mechanical reaction or "feel" created by bell crank arms or springs 292 is a result of a bending deformation rather than of a torsional deformation. Thus, rotational movement of steering shaft 212 in a clockwise direction (looking at FIGURE 5 from the left) will cause a bending of bell crank arms 292, pivotal rotation of the bell cranks about the pivotal connection formed at stub pins 288 and 289, and consequent movement of sleeve 274 away from steering shaft 212. Counterclockwise rotation of steering shaft 212 will cause movement of sleeve 274 towards the steering shaft in a similar manner. The universal joint action in this embodiment, although different from that in the FIGURE 1 embodiment, is also incorporated directly in the valve control mechanism and will eliminate adverse effects on the power boost mechanism, that would result upon the occurrence of relative movement between the vehicle body and frame.

Although my invention has been described in connection with certain specific embodiments, the principles are susceptible of numerous other applications that will readily occur to persons skilled in the art.

Having thus described the various features of my invention what I claim as new and desire to secure by Letters Patent is:

1. A power steering mechanism comprising steering means, a steering shaft, a driven shaft substantially coaxial with said steering shaft and connected to said steering means, means between said steering shaft and said driven shaft for permitting limited relative rotary motion and universal joint action therebetween, a member movably connected to one of said shafts for axial movement with respect thereto, said member being slidable only on one of said shafts and spaced from the surface of the other of said shafts to permit said aforementioned universal joint action between said shafts, means operatively connected to said member and to the other of said shafts for causing axial movement of said member in one direction upon clockwise rotation of said steering shaft and in the opposite direction upon counterclockwise rotation of said steering shaft, and power means responsive to movement of said member for applying power to said steering means.

2. A power steering mechanism as defined in claim 1 wherein said means for causing axial movement of said member comprises a lever having two arms forming an angle therebetween, said lever being pivotally connected to said one shaft at the apex of said angle to form a fulcrum at said apex and having one of said arms operatively connected to said member and the other of said arms operatively connected to the other of said shafts.

3. A power steering mechanism as defined in claim 2 which includes resilient means for opposing rotation of said steering shaft in both directions.

4. In a servomotor, driven means, a hydraulic ram drivingly connected to said driven means, a valve for controlling the operation of said ram, an operating shaft, a driven shaft substantially coaxial with said operating shaft and connected to said driven means, a lost motion connection between said operating and driven shafts for permitting limited relative rotary motion and universal joint action therebetween, a member axially slidable only on one of said shafts and spaced from the surface of the other of said shafts to permit said aforementioned universal joint action between said shafts, said member being operatively connected to one of said shafts and to said valve, and lever means for causing axial movement of said member in one direction upon clockwise rotation of said operating shaft and in the opposite direction upon counterclockwise rotation of said operating shaft, said lever means being pivotally connected to one of said shafts and having two arms extending from said pivotal connection, one of said arms being operatively connected to said member and the other of said arms being operatively connected to the other of said shafts, said pivotal connection being the fulcrum point of said lever means and having an axis substantially perpendicular to the axes of said shafts.

5. In a power steering mechanism having a power cylinder and a valve for controlling the operation of said power cylinder, a valve actuating mechanism comprising an operating shaft, a driven shaft, means between said operating and driven shafts for permitting limited relative rotary motion and universal joint action therebetween, a member axially slidable only on one of said shafts and spaced from the surface of the other of said shafts to permit said aforementioned universal joint action between said shafts, said member being operatively connected to one of said shafts and to said valve, and a bell crank lever for causing axial movement of said member in one direction upon clockwise rotation of said operating shaft and in the opposite direction upon counterclockwise rotation of said operating shaft, said bell crank lever being pivotally connected to one of said shafts and having two arms etxending from said pivotal connection, one of said arms being operatively connected to said member and the other of said arms being operatively connected to the other of said shafts, said pivotal connection being the fulcrum point of said lever and having an axis substantially perpendicular to the axes of said shafts.

6. In a power steering mechanism having a power cylinder and a valve for controlling the operation of said power cylinder, a valve actuating mechanism comprising an operating shaft, a driven shaft, means between said operating and driven shafts for permitting limited relative rotary motion and universal joint action therebetween, said means including a slot and pin connection and an annular bearing surface formed between said shafts, a member axially movable with respect to said shafts, said member being operatively connected to one of said shafts and to said valve, lever means for causing axial movement of said member in one direction upon clockwise rotation of said operating shaft and in the opposite direction upon counterclockwise rotation of said operating shaft, said lever means being pivotally connected to one of said shafts and having two arms extending from said pivotal connection, one of said arms being operatively connected to said member and the other of said arms being operatively connected to the other of said shafts, said pivotal connection being the fulcrum point of said lever means and having an axis substantially perpendicular to the axes of said shafts, and resilient means operatively connected to said operating and driven shafts for opposing rotation of said operating shaft in both directions.

7. A power steering valve actuating mechanism as defined in claim 6 wherein said resilient means includes a torsion bar having one end connected to said operating shaft and the other end connected to said driven shaft.

8. A power steering mechanism comprising steering means, a steering shaft, a driven shaft connected to said steering means, one of said shafts having a longitudinally disposed bore therein and a pair of transversely disposed slots communicating with said bore, each of said slots having radially outwardly diverging sidewalls, the other of said shafts having one end thereof disposed within said bore, an annular rounded bearing means formed on one of said shafts for operative contact with the other of said shafts, a pin-like member located in the slots of said one shaft and extending through the other of said shafts for permitting limited relative rotary motion and universal joint action between said shafts, a sleeve movably connected to one of said shafts for axial movement with respect thereto, power means responsive to movement of said sleeve for applying power to said steering means, a lever for causing axial movement of said member in one direction upon clockwise rotation of said steering shaft and in the opposite direction upon counterclockwise rotation of said steering shaft, said lever having two arms forming an angle therebetween said lever being pivotally connected to one of said shafts at the apex of said angle to form a fulcrum at said apex and having one of said arms operatively connected to said sleeve and the other of said arms operatively connected to the other of said shafts.

9. In a power steering mechanism having a power cylinder and a valve for controlling the operation of said power cylinder, a valve actuating mechanism comprising an operating shaft having a longitudinally disposed bore therein and a pair of transversely disposed slots communicating with said bore, each of said slots having radially outwardly diverging sidewalls, a driven shaft substantially coaxial with said operating shaft and having one end thereof disposed within said bore, an annular rounded bearing surface formed near the end of said driven shaft for contacting the wall of said bore, a pin-like member located in said slots and extending through said driven shaft for permitting limited relative rotary motion and universal joint action between said shafts, a sleeve axially movable with respect to said shafts, said sleeve being operatively connected to one of said shafts and to said valve, and a bell crank lever for causing axial movement of said sleeve in one direction upon clockwise rotation of said operating shaft and in the opposite direction upon counterclockwise rotation of said operating shaft, said bell crank lever being pivotally connected to one of said shafts and having two arms extending from said pivotal connection, one of said arms being operatively connected to said sleeve and the other of said arms being operatively connected to the other of said shafts, said pivotal connection being the fulcrum point of said lever and having an axis substantially perpendicular to the axes of said shafts.

10. A power steering mechanism comprising steering means, a steering shaft, a driven shaft substantially coaxial with said steering shaft and connected to said steering means, means between said steering shaft and said driven shaft for permitting limited relative rotary motion and universal joint action therebetween, a member movably connected to one of said shafts for axial movement with respect thereto, means for simultaneously opposing rotation of said steering shaft and causing axial movement of said member in one direction upon clockwise rotation of said steering shaft and in the opposite direction upon counterclockwise rotation of said steering shaft, said means including a lever having two arms forming an angle therebetween, said lever being pivotally connected to said one shaft at the apex of said angle to form a fulcrum at said apex and having one of said arms operatively connected to said member and the other of said arms operatively connected to the other of said shafts, said other arm being a cantilever spring, and power means responsive to movement of said member for applying power to said steering means.

11. In a servomotor, driven means, a hydraulic ram drivingly connected to said driven means, a valve for controlling the operation of said ram, an operating shaft, a driven shaft substantially coaxial with said operating shaft and connected to said driven means, a lost motion connection between said operating and driven shafts for permitting limited relative rotary motion and universal joint action therebetween, a member axially movable with respect to said shafts, said member being operatively connected to one of said shafts and to said valve, and lever means for causing axial movement of said member in one direction upon clockwise rotation of said operating shaft and in the opposite direction upon counterclockwise rotation of said operating shaft, said lever means being pivotally connected to one of said shafts and having two arms extending from said pivotal connection, one of said arms being operatively connected to said member and the other of said arms being a cantilever spring operatively connected to the other of said shafts for opposing rotation of said operating shaft.

12. In a power steering mechanism having a power cylinder and a valve for controlling the operation of said power cylinder, a valve actuating mechanism comprising an operating shaft, a driven shaft, means between said operating and driven shafts for permitting limited relative rotary motion and universal joint action therebetween, a member axially movable with respect to said shafts, said member being operatively connected to one of said shafts and to said valve, and a bell crank lever for causing axial movement of said member in one direction upon clockwise rotation of said operating shaft and in the opposite direction upon counterclockwise rotation of said operating shaft, said bell crank lever being pivotally connected to one of said shafts and having two arms extending from said pivotal connection, one of said arms being operatively connected to said member and the other of said arms being a cantilever spring operatively connected to the other of said shafts for opposing rotation of said operating shaft, said pivotal connection being the fulcrum point of said lever and having an axis substantially perpendicular to the axes of said shafts.

13. In a power steering mchanism having a power cylinder and a valve for controlling the operation of said power cylinder, a valve actuating mechanism comprising an operating shaft, a driven shaft, a member axially movable with respect to said shafts, said member being operatively connected to one of said shafts and to said valve, a lever for causing axial movement of said member in one direction upon clockwise rotation of said operating shaft and in the opposite direction upon counterclockiwse rotation of said operating shaft, said lever being pivotally connected to one of said shafts and having two arms extending from said pivotal connection, one of said arms being operatively connected to said member and the other of said arms being a cantilever spring operatively connected to the other of said shafts for opposing rotation of said operating shaft.

References Cited in the file of this patent

UNITED STATES PATENTS

| | | |
|---|---|---|
| 1,719,875 | Cooper | July 9, 1929 |
| 1,910,600 | Fitch | May 23, 1933 |
| 2,362,930 | Robbins | Nov. 14, 1944 |
| 2,640,322 | Puerner | June 2, 1953 |
| 2,683,778 | Creson et al. | July 6, 1954 |
| 2,796,945 | Dye et al. | June 25, 1957 |
| 2,855,065 | Lucien | Oct. 7, 1958 |
| 2,857,976 | Forster | Oct. 28, 1958 |
| 2,865,218 | Bishop | Dec. 23, 1958 |

FOREIGN PATENTS

| | | |
|---|---|---|
| 636,500 | Germany | Oct. 10, 1936 |